United States Patent [19]

O'Leary

[11] Patent Number: 5,808,378
[45] Date of Patent: Sep. 15, 1998

[54] CONTROL ARRANGEMENT AND METHOD FOR HIGH-SPEED SOURCE TRANSFER SWITCHING SYSTEM

[75] Inventor: Raymond P. O'Leary, Evanston, Ill.

[73] Assignee: S & C Electric Company, Chicago, Ill.

[21] Appl. No.: 769,387

[22] Filed: Dec. 19, 1996

[51] Int. Cl.[6] ........................................... H02J 3/04
[52] U.S. Cl. .................................. 307/87; 307/127
[58] Field of Search ............................. 307/11, 18, 23, 307/29, 43, 64, 70, 80, 81, 85–87, 112, 127

[56] References Cited

U.S. PATENT DOCUMENTS

| | | | |
|---|---|---|---|
| 4,356,402 | 10/1982 | Morimoto et al. | 307/70 |
| 5,644,175 | 7/1997 | Galm | 307/64 |

*Primary Examiner*—Richard T. Elms
*Attorney, Agent, or Firm*—James V. Lapacek

[57] ABSTRACT

A control arrangement and method is provided for high-speed source-transfer switching systems (HSSTSS). The HSSTSS supplies an electrical load with alternating current from either a first source or a second source via respective first and second solid-state switches. The HSSTSS also includes a controller that samples the voltage waveforms of each of the first and second sources to detect when transfer between the sources is desirable, e.g. outages or voltage that is either too low or too high. The controller provides appropriate control signals to control operation of the solid-state switches and transfer supply of the load therebetween. The control arrangement avoids undesirable current flow between sources via a comparison of the voltages of the sources and current in the outgoing source, i.e. a polarity comparison to ensure that the current that will flow in the incoming source after transfer will be in opposition to the current flowing in the outgoing source before transfer. Thus, the transfer is delayed until the polarity comparison is satisfied. Either separately or in combination with the polarity comparison, the control arrangement minimizes undesirable transfer delays by establishing a forced commutation condition before issuing control signals to perform the transfer between sources, i.e. the transfer is delayed until after a forced commutation condition of the current in the outgoing source is established. The forced commutation condition is preferably established by the incoming source voltage differential and the outgoing current being of the same polarity such that the voltage differential across the solid-state switch that is being turned on will establish an initial change in current flow in opposition to the current flow in the solid-state switch to be turned off.

9 Claims, 2 Drawing Sheets

CONTROL ARRANGEMENT AND METHOD FOR HIGH-SPEED SOURCE TRANSFER SWITCHING SYSTEM

BACKGROUND OF THE INVENTION

1. Field of the Invention

The present invention relates generally to high-speed source-transfer switching systems and more particularly to a control arrangement and method that controls the transfer of a load from one source to another in a desirable fashion to minimize transfer delays while also avoiding undesirable current flow between the sources.

2. Description of Related Art

High-speed source-transfer switching systems (HSSTSS) for electrical power distribution systems provide reliable, continuous power delivery to a load by transferring the supply of the load from a first source to a second independent source when undesirable characteristics are sensed in the first source. To achieve high-speed transfer operation, one type of HSSTSS utilizes solid-state switches formed by thyristors, one solid-state switch for each of the sources. These high-speed switches are also known as static transfer switches. To control the transfer operations, the HSSTSS utilizes control arrangements to provide appropriate control signals to control the operation of the thyristors of each solid-state switch via the gate of each thyristor. The control arrangements sample the voltage waveforms of each source to detect when transfer between the sources is necessary, e.g. sensing outages and momentary interruptions as well as voltage sags and swells based on the source supplying the load being above or below preset levels. HSSTSS are described in the following publications:

"Solid-State Transfer" by John Reason, Electrical World, August 1996;

"Custom Power: Optimizing Distribution Services" by John Douglas, EPRI Journal, May/June 1996;

ABB Power T&D Company Brochure 34-300, June 1995;

"ABB Static Transfer Switch Specification", ABB Power Systems Division; and

"High-Speed Transfer of Distribution Loads", presented at APPA Engineering and Operations Workshop, Apr.5, 1995, by David K. Johnson.

While these arrangements may be useful and generally satisfactory for their intended purposes, under certain circuit conditions the control arrangements introduce undesirable transfer delays and/or permit undesirable current flow between the sources.

SUMMARY OF THE INVENTION

Accordingly, it is a principal object of the present invention to provide a control arrangement and method for high-speed source-transfer switching systems that avoids undesirable current flow between sources via the comparison of the voltages of the sources.

It is another object of the present invention to provide a control arrangement and method for high-speed source-transfer switching systems that minimizes undesirable transfer delays by establishing a forced commutation condition before issuing control signals to perform the transfer between sources.

It is a further object of the present invention to provide a control arrangement for highspeed source-transfer switching systems that both avoids undesirable current flow between sources via the comparison of the voltages of the sources and minimizes undesirable transfer delays by establishing a forced commutation condition before issuing control signals to perform the transfer between sources.

These and other objects of the present invention are efficiently achieved by the provision of a control arrangement and method for high-speed source-transfer switching systems (HSSTSS). The HSSTSS supplies an electrical load with alternating current from either a first source or a second source via respective first and second solid-state switches. The HSSTSS also includes a controller that samples the voltage waveforms of each of the first and second sources to detect when transfer between the sources is desirable, e.g. outages or voltage that is either too low or too high. The controller provides appropriate control signals to control operation of the solid-state switches and transfer supply of the load therebetween. The control arrangement avoids undesirable current flow between sources via a comparison of the voltages of the sources and current in the outgoing source, i.e. a polarity comparison to ensure that the current that will flow in the incoming source after transfer will be in opposition to the current flowing in the outgoing source before transfer. Thus, the transfer is delayed until the polarity comparison is satisfied. Either separately or in combination with the polarity comparison, the control arrangement minimizes undesirable transfer delays by establishing a forced commutation condition before issuing control signals to perform the transfer between sources, i.e. the transfer is delayed until after a forced commutation condition of the current in the outgoing source is established. The forced commutation condition is preferably established by the incoming source voltage differential and the outgoing current being of the same polarity such that the voltage differential across the solid-state switch that is being turned on will establish an initial change in current flow in opposition to the current flow in the solid-state switch to be turned off.

BRIEF DESCRIPTION OF THE DRAWING

The invention, both as to its organization and method of operation, together with further objects and advantages thereof, will best be understood by reference to the specification taken in conjunction with the accompanying drawing in which.

DETAILED DESCRIPTION

Figure 1:
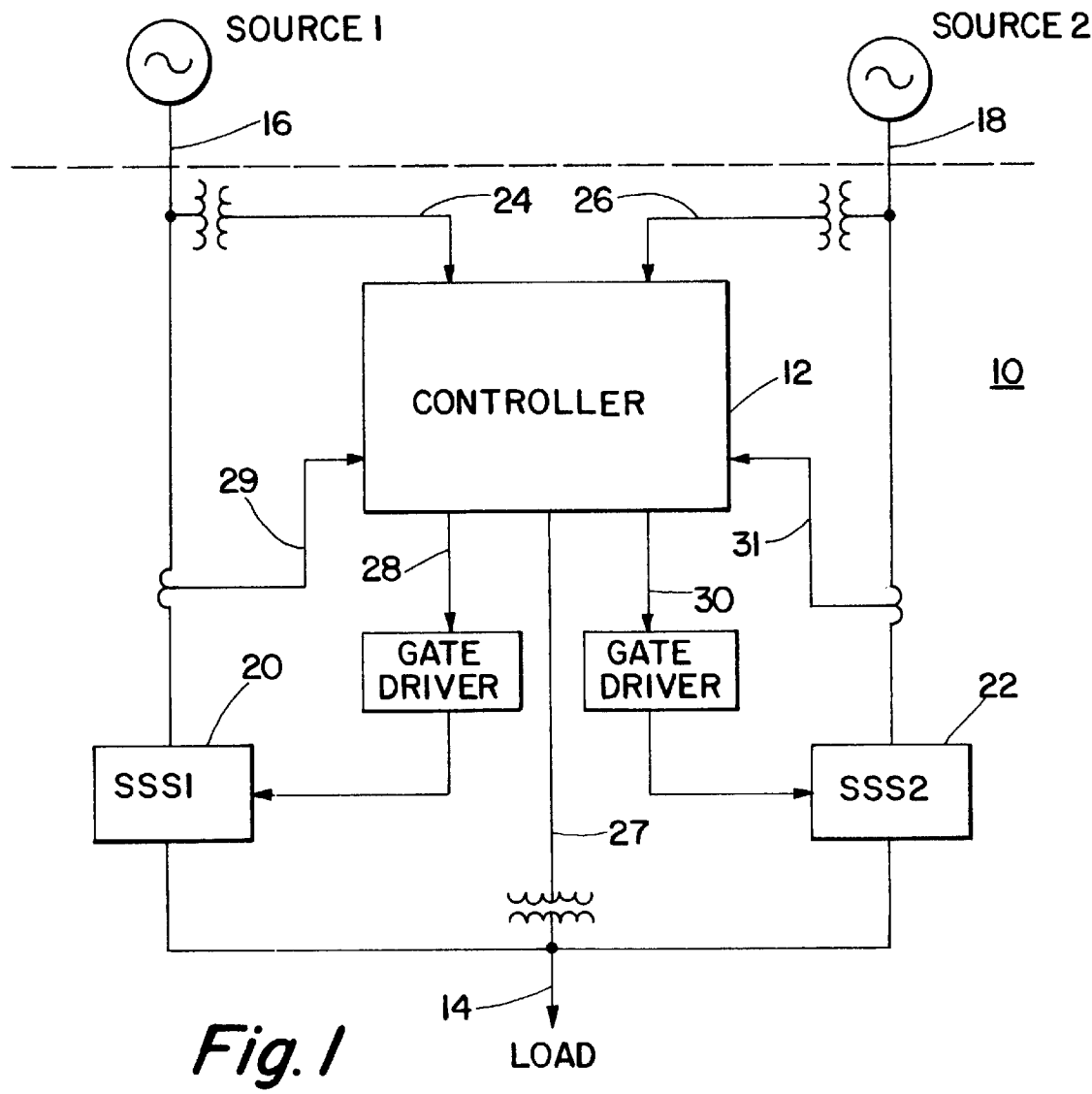
FIG. 1 is a block diagram representation of a high-speed source-transfer switching system utilizing the control arrangement of the present invention.

Referring now to FIG. 1, a high-speed source-transfer switching system (HSSTSS) 10 includes a controller stage 12 to provide an illustrative embodiment of the control arrangement and method of the present invention. The HSSTSS 10 supplies a load at 14 with an alternating current waveform via either a first AC source at 16 or a second AC source at 18. The first and second AC sources 16 and 18 and the load at 14 as provided in an electrical power distribution system are typically poly-phase circuits which are represented in FIG. 1 by a one-line diagram. The HSSTSS 10 includes a first solid-state switch, SSS1, 20 and a second solid-state switch, SSS2, 22. The HSSTSS 10 via the controller stage 12 controls either SSS1 to supply the load at 14 via the first source 16 or controls SSS2 to supply the load at 14 via the second source 18.

The controller stage 12 samples the voltage waveforms of each source 16, 18, e.g. via respective sensing inputs at 24, 26 to detect when transfer between the sources is desirable, e.g. sensing outages and momentary interruptions as well as voltage sags and swells based on the source supplying the load being above or below preset levels. The controller stage 12 provides appropriate control signals at 28, 30 to control the operation of each respective solid-state switch, SSS1 20 and SSS2 22. For example, assume that SSS1 20 is turned on by the controller stage 12 via signals at 28 so as to be conductive and supply the load at 14. If the controller stage 12 via the sensing input 24 senses that the voltage of the first source at 16 is exhibiting undesirable characteristics, the controller stage 12 via the control signals at 28, 30 turns off SSS1 and turns on SSS2 so as to transfer the supply of the load at 14 from the first source at 16 to the second source at 18. As used herein, the term "incoming" is used to describe the source and the SSS that will be turned on to supply the load (e.g. the second source at 18 and SSS2 in the illustrative example), and the term "outgoing" is used to describe the source and the SSS that is being turned off (e.g. the first source at 16 and SSS1 in the illustrative example).

Figure 2:
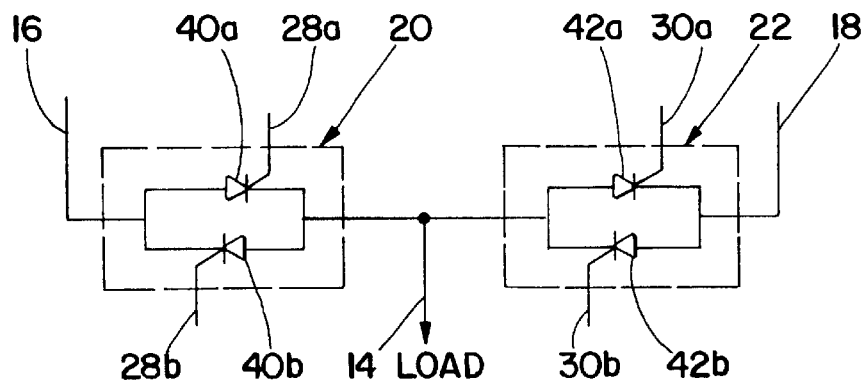
FIG. 2 is a one-line, diagrammatic representation of portions of the solid-state switch of FIG. 1.

Referring now to FIG. 2, each of the solid-state switches SSS1 and SSS2 includes one or more arrays of back-to-back connected thyristors, e.g. 40a and 40b for SSS1 and 42a and 42b for SSS2. In a particular embodiment, each array of thyristors is rated at 4.5 kV. To provide operation in a 15 kV system, a stack of nine arrays of thyristors is utilized connected in series for each phase of the sources. Thus, while term thyristor is used for 40 and 42, this refers to a thyristor stack.

Considering now operation of the control arrangement and method of the present invention, transfer of the load at 14 from one source to the other, e.g. the first source at 16 to the second source at 18, is generally accomplished by removing the gating signals at 28a, 28b to shut off SSS1 and starting the gating signals at 30a, 30b to turn on SSS2. Thus, the first source at 16 ceases to supply the load at 14 and the second source at 18 begins to supply the load at 14. This general approach can encounter problems especially when the transfer is initiated due to an upstream fault on the outgoing source, e.g. the first source at 16 in the illustration. For example, because power system loads generally are not of unity power factor, there are times when the current between the source and the load flows in opposition to the source voltage, i.e. the polarity of the voltage and current are different. If a fault and the initiation of a transfer occur when the current and voltage are of the same polarity, i.e. the current flows into the load (defined as positive) and the source voltage (relative to ground) is also positive, the cessation of gate signals to SSS1 quickly followed by the application of gate signals to SSS2 results in a desirable transfer referred to as forced commutation since the current from SSS2 opposes the current flowing in SSS1, rapidly driving the current in SSS1 to zero. However, if the load current and the first source voltage at 16 are of opposite polarity at the time transfer is initiated, e.g. if the source voltage at 16 is positive and the load current is negative, when the gating signals from SSS1 are removed, the thyristor 40b will continue to conduct until the occurrence of a current zero. If SSS2 receives gating signals before the current zero in SSS1, the second source at 18 can supply current but this current flow will not be in opposition to the current in SSS1 which results in a condition referred to as a shoot-through via the thyristors 42b and 40b. If the first source at 16 has a fault condition, the second source at 18 would begin to feed this fault condition which, of course, is very undesirable.

In accordance with important aspects of the present invention, the controller 12 performs the transfer and the application of the appropriate gating signals based on a polarity comparison between the outgoing current and the differential voltage between the first and second sources at 16, 18, e.g. by delaying the application of the gate signals to the incoming thyristor 42b in the illustrative example under predetermined detected conditions as explained in more detail hereinafter. Specifically, the source-voltage differential (i.e. difference), the voltage across the incoming SSS, is used to define a positive indication of the initial current which will flow through the incoming SSS. If the initial current which will flow through the incoming SSS opposes the current in the outgoing source, forced commutation will occur and no delay of the application of the gate signals to the incoming SSS2 is necessary. On the other hand, if the initial current which will flow through the incoming SSS supports the current in the outgoing source, a shoot-through would occur, and a delay of the application of the gate signals to the thyristor 42b is performed, i.e. until the polarity comparison is satisfied. The incoming source-voltage differential may be determined by the load voltage at 14 as sensed via a sensing input 27 or by the differential of the source voltages sensed at 24, 26.

In accordance with other important aspects of the present invention which may be practiced either separately or in combination with the foregoing polarity comparison via incoming source-voltage differential, after a decision to transfer occurs, the controller 12 is arranged to not immediately remove or cease gate signals to the outgoing SSS, e.g. SSS1. Instead, the controller 12, after a decision to transfer is made, waits until the occurrence of a forced commutation condition. Upon the detection of a forced commutation condition, the controller 12 removes the gate signals from the outgoing SSS1, and then applies gate signals to the incoming SSS2. The detection of the forced commutation condition utilizes both current and voltage, e.g. the current to SSS1 and SSS1 being sensed via respective current sensing inputs at 29 and 31.

Figure 3:
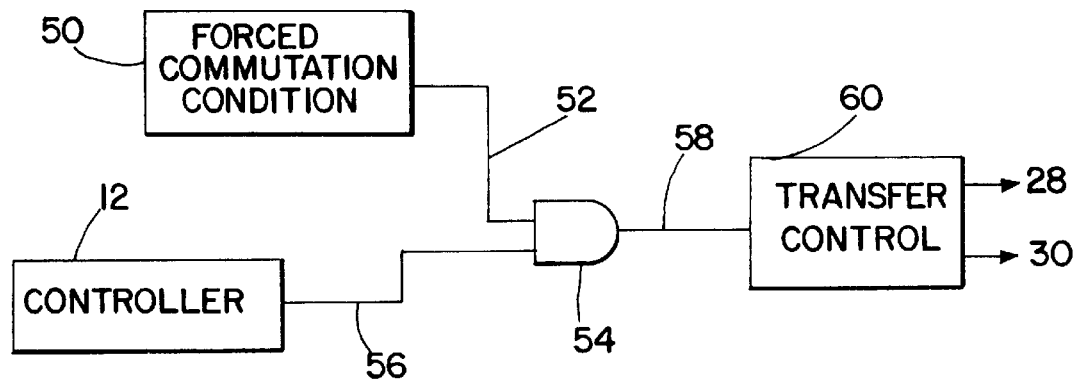
FIGS. 3 and 4 are logic and block diagram representations of specific implementations of portions of the high-speed source-transfer switching system of FIG. 1.
Figure 4:
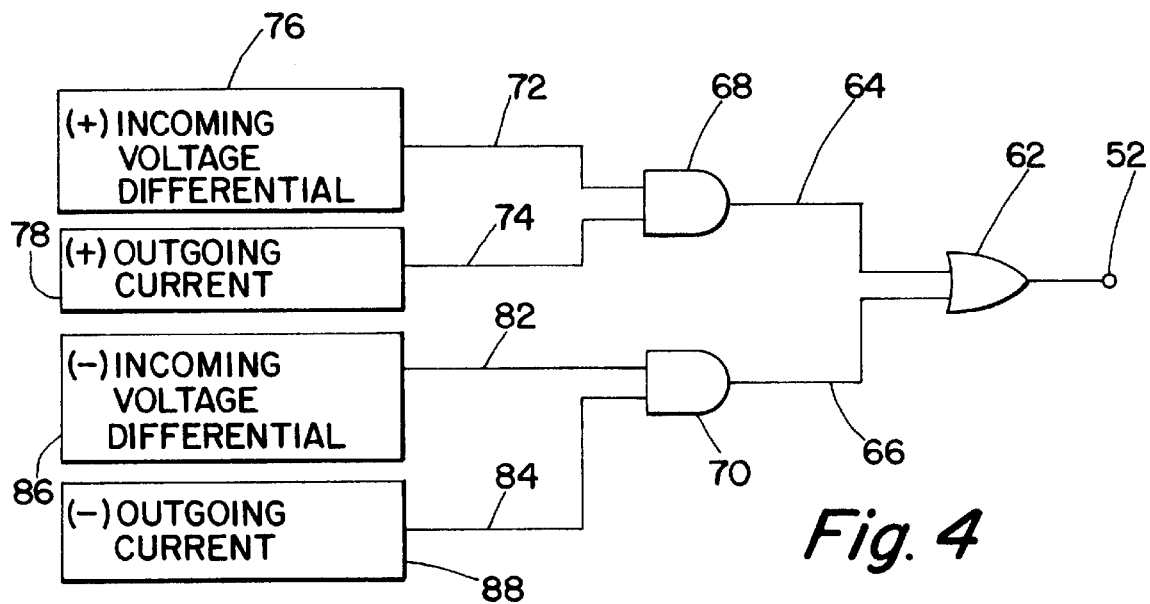

Considering a specific embodiment of the control arrangement and with additional reference to FIGS. 3 and 4, a forced commutation condition block 50 provides a signal at 52 when specific conditions are established. The signal 52 establishing a forced commutation condition is connected to one input of a two-input AND gate 54, the second input of which is connected to a transfer decision signal output 56 of the controller 12. The output 58 of the AND gate 54 provides a transfer signal to control the turn-off of the outgoing gates and the turn-on of the incoming gates, e.g. as represented by a transfer control block 60 that provides the control signal outputs 28, 30 for SSS1 and SSS2 respectively.

A specific implementation to establish the forced commutation condition of block 50 is illustrated in FIG. 4. As shown, the arrangement of FIG. 4 provides the forced commutation condition signal 52 at the output of a two-input OR gate 62 whenever the incoming source voltage differential and the outgoing current are of the same polarity. The two inputs 64, 66 of the OR gate 62 are each provided from respective outputs of two 2-input AND gates 68, 70. The inputs 72, 74 of the AND gate 68 are provided by respective condition blocks 76, 78 which establish "(+) incoming voltage differential " and "(+) outgoing current" states respectively. Similarly, the inputs 82, 84 of the AND gate 70 are provided by respective condition blocks 86, 88 which establish "(−) incoming voltage differential" and "(−) outgoing current" states respectively.

By removing the gate signals after the detection of the forced commutation condition, the positive and negative gate signals for each signal line 28 and 30 are common. However, it should be understood that if it is desired in a particular specific embodiment to remove the gate signals (e.g. 28a or 28b) from the non-conducting thyristor in the outgoing SSS1 before the detection of the forced commutation condition, this can be accomplished with the use of independent gate signals, e.g. for 28a and 28b.

Figure 5:
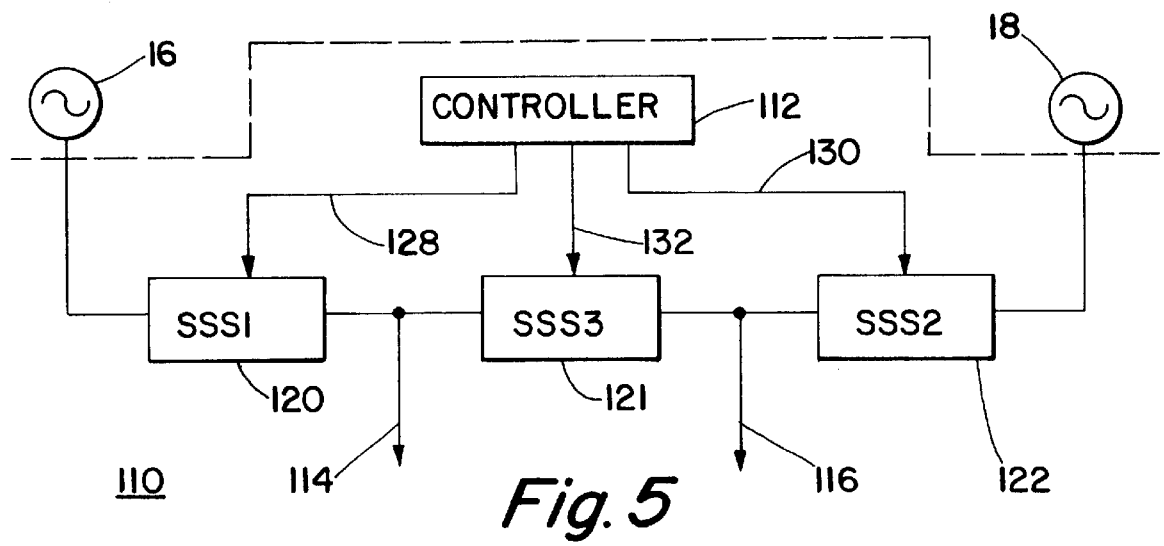
FIG. 5 is a block diagram representation of another circuit configuration of the control arrangement and method of the present invention.

Referring now additionally to FIG. 5 and considering another circuit configuration and embodiment of the control arrangement and method of the present invention where more than two solid-state switches are controlled, a controller 112 of a high-speed source-transfer switching system (HSSTSS) 110 controls solid-state switches SSS1, 120, SSS2, 122 and SSS3 121 via respective control signal paths 128, 130, and 132. The specific illustrative circuit configuration of FIG. 5 implements a split-bus primary selective system, which is used to split the load during normal operation. Specifically, in normal operation, a first source 16 supplies a first load circuit 114 via SSS1 and a second source 18 supplies a second load circuit 116 via SSS2, with SSS3 normally being turned off (nonconducting) and functioning as a bus-tie switch. Thus, each of the sources 16, 18 is a preferred source for its respective load circuit 114, 116 and each is an alternate source for the other load circuit, 116, 114 respectively. When one of the sources at 16, 18 is lost or exhibits undesirable characteristics, the controller 112, after a transfer decision is made, and as described hereinbefore, removes the signals at 128 or 130 and applies signals at 132 such that the load circuits 114, 116 are supplied from one of the sources at 16 or 18. For example, if the source 16 is lost, SSS1, 120 will be turned off and SSS3, 121, the bus-tie switch, will be turned on to supply the load circuit 114 while SSS2, 122 continues to supply the load circuit 116. The polarity comparison to establish the appropriate application of control signals in the circuit configuration of FIG. 5 utilizes the differential voltage across the incoming switch, e.g.

SSS3, 121 when transferring the load circuit 114 so as to be supplied from the source 18 via SSS3, 121 and SSS2, 122. Similarly, upon the return of the source 16, when the normal configuration is to be restored, the differential voltage across the incoming switch, e.g. SSS1, 120 is utilized for the polarity comparison.

While there have been illustrated and described various embodiments of the present invention, it will be apparent that various changes and modifications will occur to those skilled in the art. Accordingly, it is intended in the appended claims to cover all such changes and modifications that fall within the true spirit and scope of the present invention.

What is claimed and desired to be secured by Letters Patent of the United States is:

1. A control arrangement for a source-transfer switching system of the type that includes first and second solid-state switches having respective first and second control inputs, input source connections and output connections, the output connections connected to a common load circuit connection, the control arrangement comprising:

transfer control means for controlling the first and second solid-state switches via the first and second control inputs so as to selectively supply the common load circuit connection via either the first or second solid-state switch, said transfer control means further comprising first means for delaying transfer of control between the first and second solid-state switches until the incoming voltage differential across the solid-state switch to be turned on will establish an initial current flow that is in opposition to the current flow in the solid-state switch to be turned off.

2. The control arrangement of claim 1 wherein said first means comprises means for discontinuing signals on the control input of the solid-state switch to be turned off and selectively delaying the initiation of signals on the control input of the solid-state switch to be turned.

3. A control arrangement for a source-transfer switching system of the type that includes first and second solid-state switches having respective first and second control inputs, input source connections and output connections, the output connections being connected to a common load circuit connection, the control arrangement comprising:

transfer control means for controlling the first and second solid-state switches so as to selectively supply the common load circuit connection via either the first or second solid-state switch, said transfer control means further comprising first means for sensing a forced commutation condition before transferring control to the other of the source connections, said first means comprising second means responsive to said forced commutation condition being detected for discontinuing signals on the control input of the solid-state switch that is being turned off and initiating signals on the control input of the solid-state switch to be turned on.

4. The control arrangement of claim 3 wherein said forced commutation condition is defined by the voltage differential across the solid-state switch to be turned on and the current of the solid-state switch to be turned off being of the same polarity such that the incoming voltage differential across the solid-state switch to be turned on will establish an initial change in current flow that is in opposition to the current flow in the solid-state switch to be turned off.

5. The control arrangement of claim 3 wherein each of the solid-state switches include first and second solid-state devices connected in parallel so as to conduct current in opposite directions to each other, each of the first and second solid-state devices including a gate input that is connected to the control input for the solid-state switch.

6. A control arrangement for a source-transfer switching system of the type that includes first and second solid-state switches having respective first and second control inputs, input source connections and output connections, the output connections being connected to a common load circuit connection, the control arrangement comprising:

transfer control means for controlling the first and second solid-state switches via the first and second control inputs so as to selectively supply the common load circuit connection via either the first or second solid-state switch, said transfer control means further comprising first means for delaying transfer of control between the first and second solid-state switches until the voltage differential across the solid-state switch to be turned on will establish an initial current flow that is in opposition to the current flow in the solid-state switch to be turned off, said first means further comprising second means for transferring control by discontinuing signals on the control input of the solid-state switch to be turned off and initiating signals on the control input of the solid-state switch to be turned on.

7. A method for controlling a source-transfer switching system of the type that includes first and second solid-state switches having respective first and second control inputs, input source connections and output connections, the output connections being connected to a common load circuit connection, the method comprising the steps of:

controlling the first and second solid-state switches via the first and second control inputs so as to selectively supply the common load circuit connection via either the first or second solid-state switch;

detecting a condition so as to make transfer between the first and second solid-state switches desirable;

sensing a forced commutation condition; and transferring control between the first and second solid-state switches in response to said sensing step, said transferring step further comprising discontinuing signals to the control input of the solid-state switch to be turned off and initiating signals to the control input of the solid-state switch to be turned on.

8. The method of claim 7 wherein said forced commutation condition ensures that the voltage differential across the solid-state switch to be turned on will establish an initial current flow that is in opposition to the current flow in the solid-state switch to be turned off.

9. A control arrangement for a source-transfer switching system of the type that includes two input source connections, two load connections, and three solid-state switches each having respective first and second circuit connections and a control input, the solid-state switches connected in circuit via the first and second circuit connections, the load connections and the input source connections so as to selectively supply the load connections from one of the input source connections, the control arrangement comprising:

transfer control means for controlling the solid-state switches via the control inputs so as to selectively supply the load connections from one or more of the input source connections through at least two of the solid-state switches, said transfer control means further comprising first means for sensing a forced commutation condition before transferring control between the solid-state switches, said forced commutation condition including the voltage differential across the solid-state switch to be turned on and the current flow in the solid-state switch to be turned off being of the same polarity, a first solid-state switch supplying power to a first load circuit via a first source connection and a second solid-state switch supplying power to a second load circuit via a second source connection, a third solid-state switch having its first and second circuit connections connected between the first and second load circuits and being normally nonconducting, said first means upon sensing said forced commutation condition turning off one of the first or second solid-state switches and turning on the third solid-state switch.

* * * * *